United States Patent [19]
Ando

[11] 3,741,612
[45] June 26, 1973

[54] ANTI-SKID BRAKE SYSTEM

[75] Inventor: Masamoto Ando, Kariya, Aichi Pref., Toyohashi, Japan

[73] Assignee: Aisin Seiki Kabushiki Kaisha, Kariya City, Aichi Pref., Japan

[22] Filed: June 16, 1972

[21] Appl. No.: 263,433

[30] Foreign Application Priority Data
June 18, 1971 Japan.............................. 46/043844

[52] U.S. Cl............................................. 303/21 F
[51] Int. Cl................................................. B60t 8/06
[58] Field of Search.................................... 303/21 F

[56] References Cited
UNITED STATES PATENTS
3,685,867   8/1972   Inada................................ 303/21 F
3,703,320   11/1972   Remaud............................ 303/21 F

*Primary Examiner*—Richard A. Schacher
*Attorney*—Norman F. Oblon, C. Irvin McClelland et al.

[57] ABSTRACT

An anti-skid brake system for the vehicle wheel which acts to limit, decrease, and permit subsequent increase of the brake application pressure in accordance with the generation of skid sensing signals, the brake system comprising a throttle means for controlling the pneumatic pressure supply to a servomotor assembly whereby the initial movement of the brake pressure reducing operation is started substantially simultaneously with generation of the skid sensing signal, while the brake pressure is subsequently reduced with a suitable decreasing ratio.

8 Claims, 5 Drawing Figures

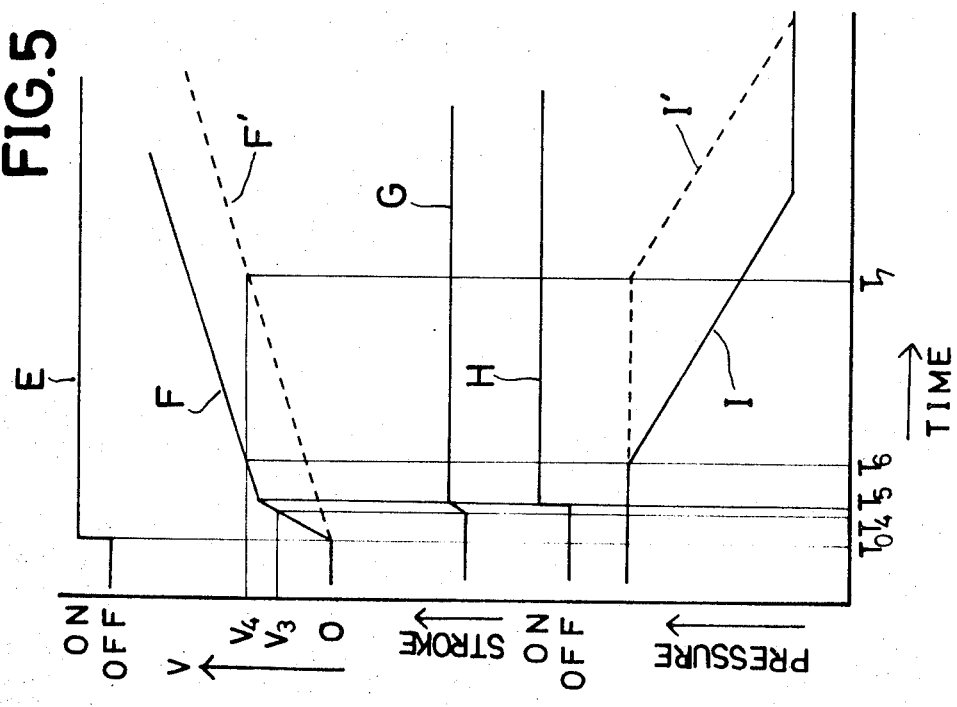
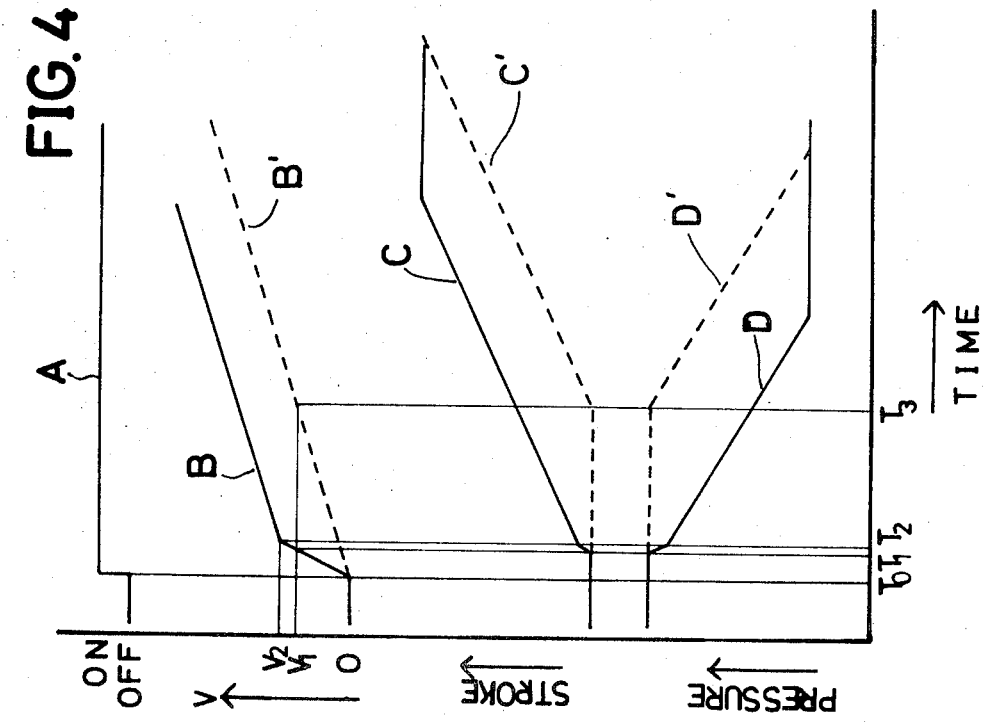

ANTI-SKID BRAKE SYSTEM

BACKGROUND OF THE INVENTION

The present invention relates generally to an anti-skid brake system for the vehicle, and more particularly to an improved anti-skid brake system which acts in accordance with a skid sensing signal delivered thereto from skid sensing and computer means to limit, and release, the hydraulic pressure being supplied to wheel brakes to a lesser value and to permit an increase in the brake application pressure in a cycle of operation which prevents the wheel brakes from locking up and maintains a more effective vehicle braking force.

It is desirous in an anti-skid brake system to satisfy both requirements that, when the skid sensing signal is generated the brake system starts its brake pressure reducing operation as soon as possible, and, that after the start of the pressure reducing operation, the reducing ratio of the brake application pressure is such so as to follow the signal from the computer, namely, the brake application pressure is reduced with a speed suitable for following the signal from the computer.

In order to set the starting time of the pressure reducing operation to be substantially simultaneous with generation of the skid-sensing signal, it will be necessary, for instance, to provide a predetermined pneumatic pressure difference in the pneumatic servo device for actuating the pressure reducing assembly as soon as possible. For this purpose, it is necessary to provide an atmospheric air conduit of a large diameter. However, with such structure, the pressure reducing operation is normally accomplished too rapidly so that it is very difficult to follow the signal from the computer.

On the other hand, if a throttling means should be provided within the atmospheric air conduit, the pressure reducing operation could be accomplished with suitable speed. However, the starting time of the pressure reducing operation would be unavoidably delayed.

SUMMARY OF THE INVENTION

Accordingly, it is an object of the present invention to provide an anti-skid brake system which can start its pressure releasing operation substantially simultaneously with the generation of skid sensing signals and can reduce the brake application pressure with a suitable speed while the skid sensing signal is being generated.

Another object of the present invention is to provide an anti-skid brake system in which the pressure releasing and applying operation can be repeated in a cycle with the hydraulic pressure communication between a master cylinder and wheel brakes being interrupted, in other words, the hydraulic pressure communication can be reestablished after having decreased the hydraulic pressure of the wheel brakes upon the system returning to the normal condition wherein no skid sensing signal is applied. Accordingly, no impact or shock is applied to the brake pedal.

Still another object of the present invention is to provide an anti-skid brake system in which a switch means for detecting the accidental movement of means for cutting off the hydraulic pressure communication can be utilized also for actuating a pneumatic air throttling assembly.

The foregoing objectives are achieved according to this invention through the provision of an anti-skid brake system having a throttle control means for controlling the pneumatic pressure supply to the system's servomotor assembly whereby the initial actuation of the brake pressure reducing operation is enabled to be started substantially simultaneously with the generation of a skid-sensing signal, while the brake pressure is subsequently reduced with a suitable decreasing ratio through the interaction of various solenoid-operated piston-and-cylinder assemblies.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein:

FIG. 4 is a graph showing characteristic curves associated with the anti-skid brake system of FIG. 1 in comparison with those of a conventional system; and FIG. 5 is a graph showing characteristic curves associated with the anti-skid brake system of FIG. 2 in comparison with those of a conventional system.

DETAILED EXPLANATION OF THE INVENTION

Figure 1:
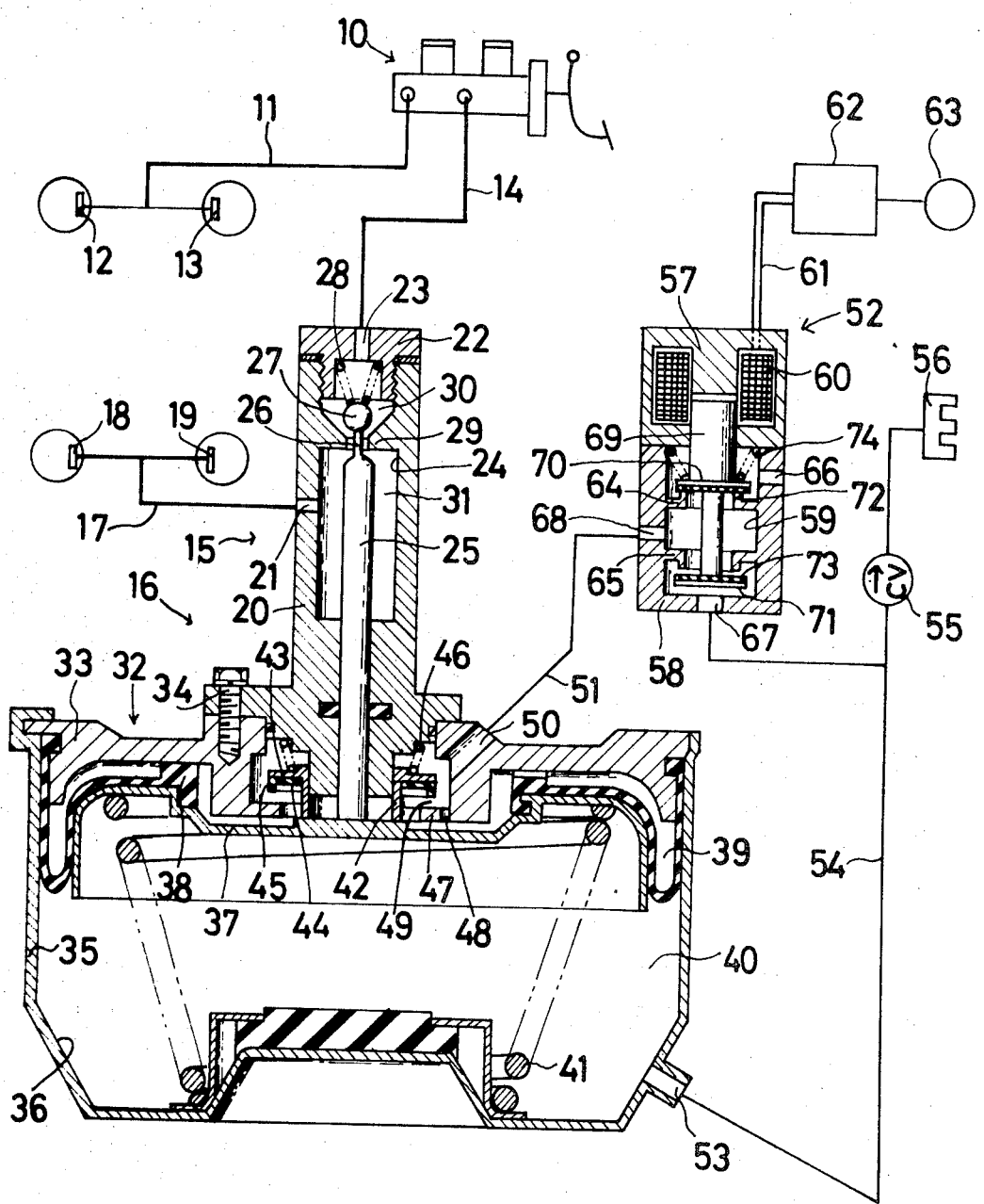
FIG. 1 is a schematic view of an anti-skid brake system constructed according to this invention and illustrating the components thereof as they are under normal conditions.

Referring now to the drawings, and more particularly to FIG. 1 thereof, there is shown the vehicle wheel brake system which includes a master cylinder generally indicated by the reference character 10, which for example is illustrated as being of the dual pressure chamber type with the front chamber connected through conduit means 11 to the front wheel brakes 12 and 13, while the rear chamber is connected through conduit means 14 to a hydraulic pressure reducing assembly, generally indicated by the reference character 15, of a modulator assembly generally indicated by the reference character 16. The reducing assembly 15 is in turn connected through conduit means 17 to the rear wheel brakes 18 and 19. The reducing assembly 15 includes a cylindrical housing 20 provided with a radially extending outlet opening 21 for connection with conduit means 17, an upper threaded plug 22 provided with an axially extending inlet opening 23, and an axially extending bore 24. A displaceable cylindrical, axially disposed piston 25 is reciprocably mounted within the housing 20, the upper end 26 of which is of a relatively reduced diameter which is kept in contact with a check ball 27 under normal conditions, the ball 27 normally being urged downwardly by an axially disposed coil spring 28.

The housing 20 further comprises an inner annular shoulder 29 adapted for seating the ball 27, such that when the piston 25 is shifted downward from the position shown in FIG. 1, the ball 27 is seated against the shoulder 29 thereby interrupting fluid communication between the master cylinder 10 and the rear wheel brakes 18 and 19. It is thus seen that the bore 24 of the reducing assembly 15 is divided into a first upper chamber 30 and a second lower chamber 31 by the annular shoulder means 29.

The modulator assembly 16 comprises a servomotor assembly generally indicated by the reference character 32 which includes an upper walled section 33 fixed to the housing 20 of the reducing assembly 15 by bolt means 34 and a cylindrical lower walled section 35 secured to the upper section 33 and thereby defining a recess 36. A plate-type piston 37 is positioned within the recess 36 and cooperates with an annular diaphragm 38 so as to provide a power wall which divides the recess 36 into a first upper chamber 39 and a second lower chamber 40. An axially aligned power wall spring 41 is contained within the second chamber 40 and is adapted to urge the piston 37 and the diaphragm 38 in a direction which tends to decrease the volume of the first chamber 39.

At the top of the piston 37 there is supported a substantially cylindrical atmospheric air regulating member 42 slidably mounted upon the lower end portion of the housing 20 of the reducing assembly 15. The regulating member 42 includes an annular wing portion 43, to the lower surface of which is secured an annular rubber member 44 having an annular downwardly projecting flange portion 45, member 42 being normally urged to move in a downward direction by a coil spring 46. It will be seen that the lower end of the cylindrical piston 25 is kept in contact with the plate piston 37 of the servomotor 32 under normal conditions.

The upper walled section 33 includes an annular radially projecting flange portion 47 at the lower level of section 33 having a narrow vertically oriented through-hole 48 therein. There is also provided a pneumatic passage 49 defined between the downwardly projecting flange 45 and the radially projecting flange 47 under normal conditions, while when the regulating member 42 is moved slightly downward from the position shown in FIG. 1, projecting flange 45 of the rubber member 44 will be seated against the projecting flange 47. The upper section 33 is further provided at its upper level with a large inclined through-hole 50 which is pneumatically connected through suitable conduit means 51 to an electromagnetic change-over assembly generally indicated by the reference character 52, while the lower section 35 of the servomotor assembly 32 is provided at its lower level with a vacuum supply inlet hole 53 which is connected through suitable conduit means 54 to a check valve 55, which is in turn connected to a suitable vacuum source such as, for example, an engine intake manifold 56.

The electromagnetic change-over assembly 52 includes a cylindrical upper section 57, a cylindrical lower section 58 fixed to the upper section 57, and a through-hole 59 extending within both sections 57 and 58. An annular, axially disposed electromagnetic solenoid 60 is mounted within the upper section 57 and is electrically connected through a conductor 61 to a conventional computer 62 and conventional wheel-skid sensor means 63. The lower section 58 includes a pair of inner annular radial projections 64 and 65, an atmospheric air inlet 66 radially disposed within side wall, a vacuum inlet 67 disposed within the bottom wall, and an outlet 68 radially disposed within the side wall. Within the through-bore 59 there is mounted a displaceable piston 69 having a pair of spaced annular shoulders 70 and 71 disposed within parallel planes and a pair of annular rubber members 72 and 73 secured to the shoulders 70 and 71 being adapted for seating against the radial projections 64 and 65, respectively, the shoulder-rubber member combinations in effect forming plate-type valve members. A coil spring 74, being co-axial with piston 69, is provided between the upper shoulder 70 and the upper section 57 for urging the piston 69 to move in a downward direction as seen in FIG. 1.

Under normal conditions, the upper rubber member 72 is seated against the upper radial projection 64 while the lower rubber member 73 is unseated with respect to the lower radial projection 65. The outlet 68 of the change-over assembly 52 is connected through the conduit 51 to the hole 50 of the servomotor 32 while the vacuum inlet 67 is connected through a suitable conduit 75 to the intake manifold 56.

In the normal condition of brake operation wherein the computer 62 generates no signal, due to the fact that the skid sensing means 63 has not generated a skid-sensing signal, the position of the various elements of the brake system is as shown in FIG. 1. Thus the first and second chambers 39 and 40 are at vacuum supply pressure and the spring 41 is holding the power wall in its upward condition so that it positively urges the piston 25 upwardly with a sufficient force to hold the check ball 27 in its unseated position. Therefore, the hydraulic pressure generated in the rear chamber of the dual master cylinder 10 is freely admitted to the rear wheel brakes 18 and 19 via the conduit 14, the inlet opening 23 of the reducing assembly 15, the first and second chambers 30 and 31 thereof, the outlet opening 21, and the conduit means 17, simultaneously with hydraulic pressure being admitted to the front wheel brakes 12 and 13 via the conduit 11.

When the computer 62 generates a signal in response to a skid-sensing signal of means 63, indicating that the brake pressure to the wheel brakes 18 and 19 should be released, the solenoid 60 is energized thereby causing the piston 69 to shift upwardly against the atmospheric pressure acting upon the upper shoulder 70 and the biasing force of the spring 74. Therefore, the rubber member 72 is unseated from the upper radial projection 64 while the rubber member 73 is seated against the lower radial projection 65 so that the atmospheric air is now admitted to the first upper chamber 39 of servomotor 32 via the narrow through-hole 48 and the passage 49, via inclined through-hole 50, conduit 51, and outlet 68. The pressure difference V is thus generated between the first and second chambers 39 and 40 of the servomotor 32, thereby causing the piston 37 to move in a downward direction against the biasing force of the spring 41. The piston 25 of the reducing assembly 15, and the check ball 27 thereof follow the downward movement of the piston 37 due to the hydraulic pressure in the bore 24 and the spring 28. After a predetermined downward movement of the piston 25, the ball 27 is seated against the shoulder 29 thereby interrupting the fluid pressure communication between the first chamber 30 and the second chamber 31, while the piston 25 continues to slide down due to the hydraulic pressure in the second chamber 31. The volume of the second chamber 31 increases in accordance with the downward movement of the piston 25 thereby reducing the hydraulic pressure in the rear wheel brakes 18 and 19.

The rubber member 44 of the air regulating member 42 is likewise seated against the radially projecting flange 47 of the servomotor 32 after a predetermined movement of the piston 37 so that the atmospheric air is admitted to the first chamber 39 only through the narrow through-hole 48. Therefore, the speed of the downward movement of the power wall will decrease, thereby permitting the piston 25 to move with relatively low speed.

Referring now to FIG. 4, the movement of each element of the brake system can be shown by the characteristic lines, in which A is a line of a signal applied to the solenoid 60, B is a line of the pneumatic pressure difference between the first chamber 39 and the second chamber 40, C is a line of a stroke of the power piston 37, and D is a line of the hydraulic pressure being applied to the rear wheel brakes 18 and 19. As shown, when the pneumatic pressure difference V attains the value $V_1$ at the time $T_1$, the power piston 37 begins its downward stroke thereby reducing the hydraulic pressure D. At the value $V_2$ of the pneumatic pressure difference V at the time $T_2$ the line B has a smaller positive slope indicating a decrease in the increasing ratio of the pneumatic pressure difference V and simultaneously, the line D also has a smaller slope angle indicating a decrease in the hydraulic pressure to the rear wheel brakes 18 and 19 with the proper decreasing ratio V. According to the conventional brake system shown by the dotted lines, a line B' of the pneumatic pressure difference attains the value $V_1$ at the time $T_3$. Thence, the power piston starts its stroke at the time $T_3$, as shown by a line C', and the hydraulic pressure to the rear wheel brakes begins to be decreased at the time $T_3$ as shown by a line D'. The time $T_1$ is much shorter than the time $T_3$ so that the reduction of the hydraulic pressure to the rear wheel brakes can start its initial phase at a much earlier time according to the invention.

When the skid indicating signal terminates, the change-over assembly 52 returns to the normal position as shown in FIG. 1 so that the other elements of the brake system obtain their original positions, thereby reestablishing the fluid pressure communication between the master cylinder 10 and the rear wheel brakes 18 and 19. Another skid indicating signal subsequently generated by the sensor 63 will cause the aforesaid movement of the elements of the brake system to occur again. Thus, the hydraulic pressure releasing and applying movement from and to the rear wheel brakes 18 and 19 is repeated.

Figure 2:
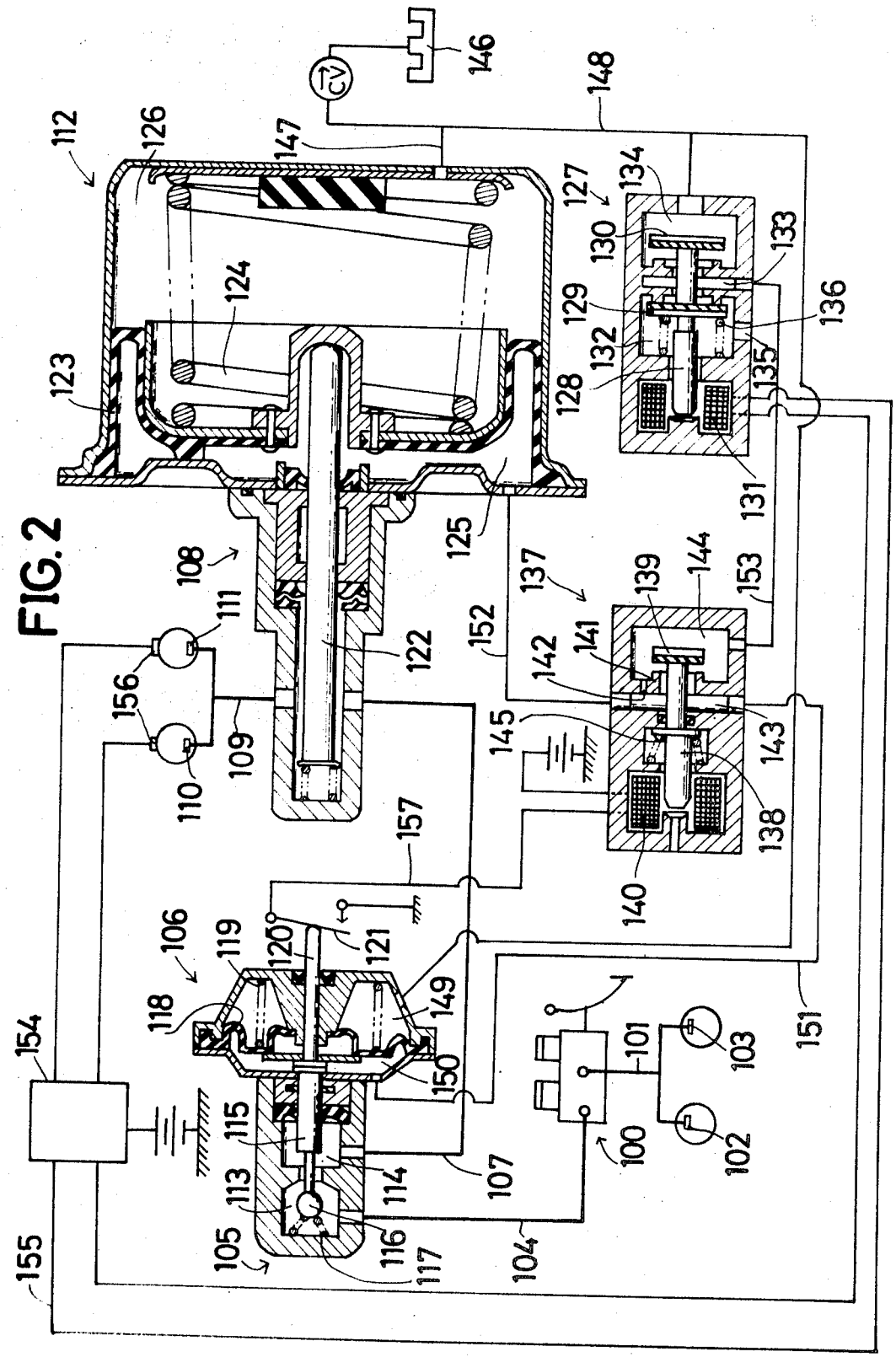
FIG. 2 is a view similar to that of FIG. 1 illustrating a second embodiment of the invention.

Referring now to FIG. 2, a second embodiment of the invention is illustrated. A dual master cylinder generally indicated by the reference character 100 is connected through conduit means 101 to the front wheel brakes 102 and 103 and through conduit means 104 to a pressure cut-off assembly generally indicated by the reference character 105 adapted for being actuated by a smaller servo device, generally indicated by the reference character 106. The cut-off assembly 105 is fluidically connected through conduit means 107 to a pressure reducing assembly generally indicated by the reference character 108 of the modulator being in turn connected through conduit means 109 to the rear wheel brakes 110 and 111 and adapted for being actuated by a larger servo device, generally indicated by the reference character 112, of the modulator.

The cut-off assembly 105 includes a first cylindrical, axially disposed chamber 113, a second cylindrical, axially disposed chamber 114, a cylindrical piston 115 extending within both chambers 113 and 114, a ball 116 located within the first chamber 113 and kept in contact with the piston 115 by a coil spring 117, spring 117 also tending to urge the ball 116 to move toward the right. The piston 115 is kept in contact, at its right end, with a transverse power wall 118 of the servo device 106, the power wall 118 being urged to move in the left direction by a coil spring 119. The biasing force of the spring 119 is larger than that of the spring 117 so that the first and second chambers 113 and 114 are fluidically communicated with each other in the normal condition, as shown in FIG. 2. A cylindrical, axially disposed rod 120 of the servo device 106 is kept in contact with the power wall 118 at its left end and is cooperable with a switch 121 at its right end.

The pressure reducing assembly 108 includes cylindrical, axially disposed piston 122 being kept in contact with a power wall 123 of the servo device 112. The power wall 123 is urged to move in the left direction by an axially aligned coil spring 124 so that as long as a vacuum is created relative to both a first chamber 125 and a second chamber 126 of the larger servo device 112 the piston 122 is located in the position shown in FIG. 2.

A change-over valve assembly generally indicated by the reference character 127, includes a cylindrical, axially disposed piston 128, a pair of plate-type valve members 129 and 130, each being fixed to the piston 128 and disposed within spaced parallel planes, and an annular, axially disposed solenoid 131 adapted for actuating the piston 128. The interior of the valve assembly 127 is divided into a left of atmospheric cylindrical chamber 132, an intermediate disc-shaped chamber 133, and a right or vacuum cylindrical chamber 134 by the inner radially projecting seats for the valve members 129 and 130. A through-hole 135 leads into chamber 132 and normally communicates with the atmospheric air. A return spring 136, co-axial with piston 128 urges the valve member 129 to move in the direction such that the atmospheric chamber 132 does not communicate with the intermediate chamber 133.

A throttle valve assembly, generally indicated by the reference numeral 137, includes a cylindrical, axially disposed piston 138, a plate-type valve member 139 fixed to the end of the piston 138, an annular, axially disposed solenoid 140 adapted for actuating the piston 138, and an inner, radially extending partition wall 141 provided with a through-hole 142. The interior of the throttle valve assembly 137 is divided into a left disc-shaped chamber 143 and a right cylindrical chamber 144, through-hole 142 connecting the two chambers. A return spring 145, co-axial with piston 138 urges the piston 138 to move in the direction such that the left and right chambers 143 and 144 communicate with each other.

A vacuum source, such as, for example, an engine intake manifold 146, is connected through conduit means 147 to the second chamber 126 of the larger servo device 112 and through conduit means 148 to the right chamber 134 of the change-over valve assembly 127. The conduit 148 also leads the vacuum to a right chamber 149 of the smaller servo device 106. A left chamber 150 of the smaller servo device 106 is connected through a conduit 151 to the left chamber 143 of the throttle valve assembly 137 which is in turn connected through a suitable conduit means 152 to the first chamber 125 of the larger servo device 112. The right chamber 144 of the throttle valve assembly 137 is similarly connected through conduit means 153 to the intermediate chamber 133 of the change-over valve assembly 127.

A conventional computer 154 is electrically connected through suitable conduit means 155 to the solenoid 131 of the change-over valve assembly 127 and is operated by skid sensing means 156 which are secured to the rear vehicle wheels. The switch 121 is electrically connected through suitable conduit means 157 to the solenoid 140 of the throttle valve assembly 137.

In the normal condition of the brake system as is shown in FIG. 2, the hydraulic pressure from the master cylinder 100 is admitted through the conduit 101 to the front wheel brakes 102 and 103 and simultaneously is admitted to the rear wheel brakes 110 and 111 through the conduit 104, the first chamber 113 of the cut-off valve assembly 105, the second chamber 114 thereof, the conduit 107, the reducing assembly 108, and the conduit 109. Thus the normal brake operation is performed.

When the skid sensing signal from the skid sensing means 156 and the computer 154 is applied to the solenoid 131 of the change over assembly 127 in order to actuate the piston 128 towards the left, the atmospheric air is now applied through the atmospheric chamber 132 to the intermediate chamber 133 which normally communicates with the vacuum chamber 134, due to appropriate actuation of the valve members 129 and 130. Therefore, the atmospheric air is admitted to the left chamber 143 of the throttle valve assembly 137 through both the hole 142 and the axial clearance between the partition wall 141 and the valve member 139, the air being subsequently delivered to the conduit means 151 and 152. The atmospheric air within the conduit 151 is then admitted to the left chamber 150 of the smaller servo device 106 thereby permitting the power wall 118 and the piston 115 to move toward the right, as the right chamber 149 thereof is normally connected through the conduit 148 to take manifold 146. Thus the ball valve 116 is caused to cut-off the fluid communication between the master cylinder 100 and the rear wheel brakes 110 and 111. Simultaneously with the cutting-off action of the ball valve 116, the switch 121 is actuated by movement of piston 115 and rod 120 to energize the solenoid 140 of the throttle valve assembly 137 so that the valve member 139 is seated against the partition 141. After the seating of the valve member 139, the atmospheric air is supplied to the conduit 152 only through the hole 142 of the throttle valve assembly 137, the supply therefore being reduced. It should be noted that the smaller servo device 106 is so designed and constructed that it can start its operation earlier than the larger servo device 112.

The atmospheric air in the conduit 152 is admitted to the left chamber 125 of the larger servo device 112 thereby causing the power wall 123 and the piston 122 to move toward the right at a predetermined speed, as the right chamber 126 thereof is normally communicated with the intake manifold 146 through the conduit 147. Due to the rightward movement of the piston 122 the hydraulic pressure in the rear wheel brakes 110 and 111 is reduced since the pressure supply from the master cylinder 100 has already been cut off.

In order to explain the above operation more specifically, reference is now made to FIG. 5 and the characteristic lines disclosed there, wherein E is a line of the state of the solenoid 131 of the change-over valve assembly 127, F is a line of the pneumatic pressure difference existing between the left and right chambers 125 and 126 respectively, of the larger servo device 112, G is a line of the stroke of the power wall 118 of the smaller servo device 106, H is a line of the state of the solenoid 140 of the throttle valve assembly 137, and I is a line of the hydraulic pressure being applied to the rear wheel brakes 110 and 111.

When the solenoid 131 of the change-over valve assembly 127 is energized at the time $T_0$, a pneumatic pressure difference is generated between the left and right chambers 125 and 126 thereby causing the power wall 123 to move toward the right (See FIG. 2). When the pneumatic pressure difference V attains the value of $V_3$ at the time $T_4$, the power wall 118 of the smaller servo device 106 starts its operation. At the time $T_5$ wherein the power wall 118 has been moved a predetermined distance, the switch 121 is actuated to energize the solenoid 140 of the throttle valve assembly 137. Simultaneously with the energization of the solenoid 140, the rising ratio of the pneumatic pressure difference V in the larger servo device 112 is decreased as shown by the line F which has a less positive slope after time $T_5$ than before such time. When the said difference V attains the value $V_4$ at the time $T_6$, the hydraulic pressure in the rear wheel brakes 110 and 111 begins to be decreased as is shown by the line I, which has a negative slope after time $T_6$.

In comparison with the characteristics of a conventional brake system as indicated by the dotted lines F' and I', the hydraulic pressure in the rear wheel brakes does not begin to be decreased until the time $T_7$ at which time the pneumatic pressure difference V attains the value of $V_4$. In summary, it takes a substantially shorter period of time before the reducing device starts its pressure reducing operation according to the invention, than with conventional systems.

Figure 3:
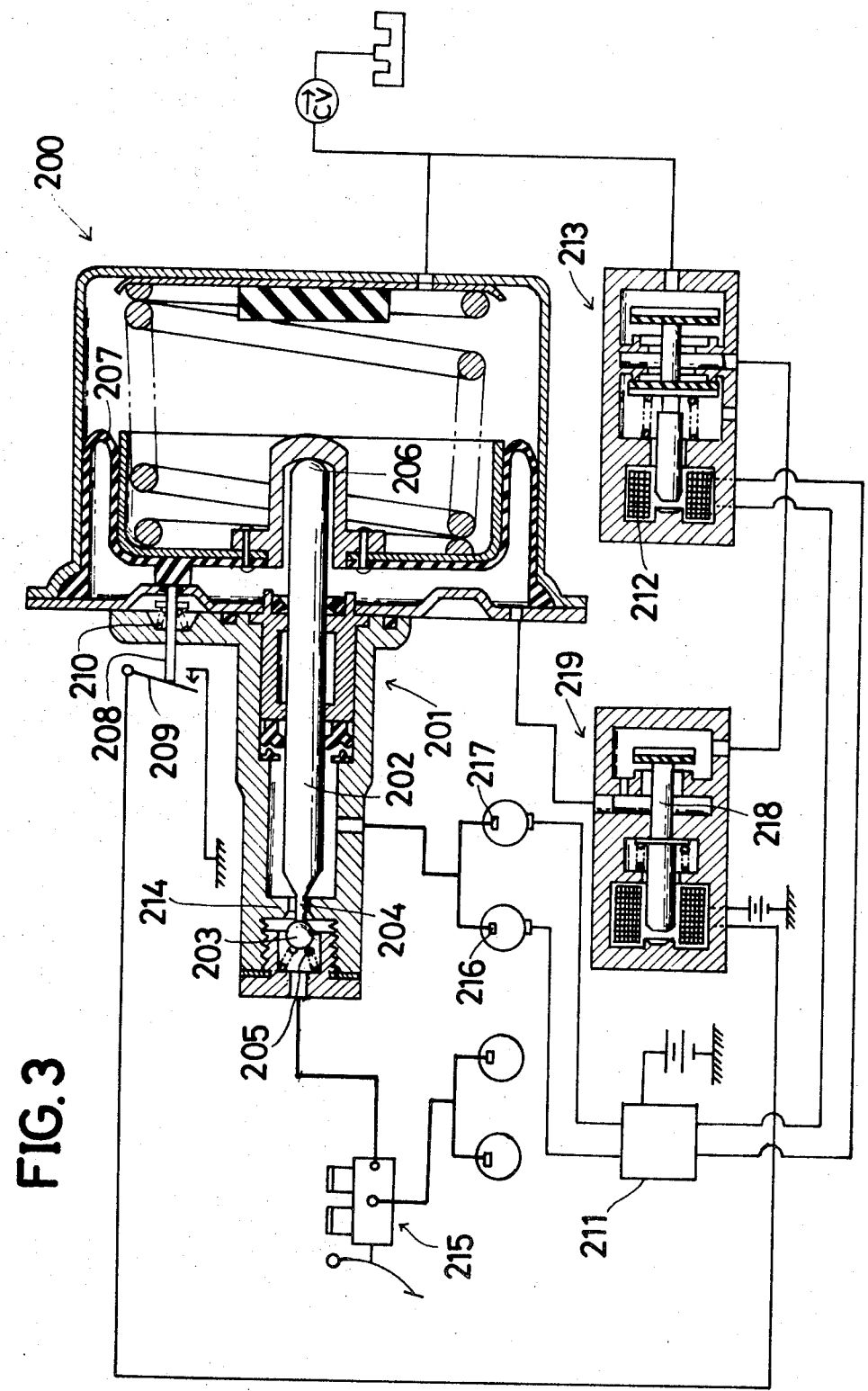
FIG. 3 is a view similar to that of FIG. 1 illustrating a third embodiment of the invention.

Referring now to FIG. 3, a third embodiment of the invention is illustrated. While the second embodiment of the invention included a smaller servo device 106 and a larger servo device 112, it is noted that the third embodiment includes but a single servo device, generally indicated by the reference character 200, of the modulator which serves both as the smaller and larger servo devices of the second embodiment. More specifically, a pressure reducing valve assembly generally indicated by the reference character 201 of the modulator includes a cylindrical, axially disposed piston 202, a check-ball 203 kept in contact with the left end 204 of the piston 202, and an axially disposed compressed coil spring 205 normally urging the ball 203 to move toward the right. The right end 206 of the piston 202 is kept in contact with a power wall 207 of the servo device 200.

The reducing valve assembly 201 further includes an actuating rod 208 which is kept in contact with the power wall 207 at its right end and is operatively connected to a switch 209 at its left end. When the power wall 207 is moved toward the right, the rod 208 is also moved to the right by a compressed spring 210, coaxially disposed with respect to rod 208, thereby actuating the switch 209. As the construction of the other elements are substantially the same as that of the second embodiment the detailed explanation of such will be omitted.

In operation, when the skid sensing signal is applied from appropriate skid sensing means through a computer 211 to an annular axially aligned solenoid 212 of a change-over assembly, generally indicated by the reference character 213, at first the power wall 207 is moved to the right thereby permitting the piston 202 to move in the same direction. Therefore, the ball 203 is seated against an inner, radially extending shoulder wall 214 of the reducing device 201 so as to cut off the fluid communication between the dual master cylinder, generally indicated by the reference character 215, and the rear wheel brakes 216 and 217. Simultaneously with the seating action of the ball 203, the rod 208 is moved to actuate the switch 209 thereby permitting a cylindrical, axially disposed piston 218 of a throttle assembly, generally indicated by the reference character 219 to move toward the left. Thereafter the pneumatic air to be supplied to the servo device 200 is being throttled. It will also be noted that in this embodiment the piston 202 is moved rapidly before the actuation of the switch 209 and is moved with a predetermined speed after the actuation thereof.

Thus, it may be seen that the anti-skid brake system of the present invention has important advantages over the known prior art structures in that the pressure releasing or reducing operation is commenced substantially simultaneously with the generation of a skid-sensing signal, the operation also being subsequently conducted with an appropriate amount of rapidity for efficient operation of the system in accordance with the system control means.

Obviously, many modifications and variations of the present invention are possible in light of the above teachings. It is to be understood, therefore, that within the scope of the appended claims, the present invention may be practiced otherwise than as specifically described herein.

What is claimed as new and desired to be secured by Letters Patent of the United States is:

1. An anti-skid brake system for vehicle brake wheels comprising:
   a master cylinder generating fluid pressure;
   wheel brakes actuated by said fluid pressure;
   means for generating a skid sensing signal;
   a change over valve assembly actuated by said skid sensing signal and associated with an atmosphere and a vacuum source for controlling the flow of the atmospheric air and vacuum;
   a cut off valve assembly interposed between said master cylinder and wheel brakes and including a check ball to control the fluid communication therebetween;
   a hydraulic pressure reducing assembly interposed between said master cylinder and wheel brakes and including a housing, and a piston slidably fitted in said housing;
   a pneumatic servomotor assembly associated with said reducing assembly and including a housing, a first chamber connected to said change over assembly, a second chamber connected to said vacuum source, a power wall defining said first and second chambers and operatively connected to said piston of the reducing assembly, said piston being slidable in accordance with the atmospheric air supply to said first chamber; and
   throttle means interposed between said first chamber and said change over valve assembly and including a first passage and a second passage, said first passage being decreasingly varied in accordance with the atmospheric air supply to said first chamber and the atmospheric air being supplied only through said second passage after a predetermined value of the atmospheric air supply.

2. An anti-skid brake system as set forth in claim 1, wherein a spring is interposed between said housing of the reducing assembly and said throttle means, and said throttle means is mounted on said power wall to follow the movement of said power wall with the biasing force of said spring, thereby controlling the flow amount of the atmospheric air.

3. An anti-skid brake system as set forth in claim 2, wherein said throttle means is of a cylindrical shape and slidably mounted upon said housing of the reducing assembly.

4. An anti-skid brake system as set forth in claim 3, wherein said throttle means comprises an annular shoulder and said housing of the pneumatic servomotor assembly is provided with a through hole normally connected to said first chamber and said change over valve assembly, whereby a clearance between said shoulder and said housing of the pneumatic servometer assembly constitutes said first passage and said through hole constitutes said second passage.

5. An anti-skid brake system as set forth in claim 1, further comprising a smaller servomotor assembly which includes a housing, a rod mounted in said housing and operatively connected to said cut off valve assembly, and switch means operatively connected to said rod.

6. An anti-skid brake system as set forth in claim 5, wherein said throttle means comprises a housing, a solenoid electrically connected to said switch means, and a valve piston fitted in said housing and movable by energization of said solenoid.

7. An anti-skid brake system as set forth in claim 6, wherein said smaller servomotor assembly further comprises a first chamber connected to said first chamber of said first mentioned servomotor assembly, a second chamber connected to said vacuum source, a through hole provided on said throttle means housing and normally connected to said first and second chambers of the smaller servomotor assembly, and a power wall defining said first and second chambers thereof.

8. An anti-skid brake system as claimed in claim 6, wherein said smaller servo assembly further comprises a single chamber, said rod being passed through said single chamber, one end of said rod being kept in contact with said power wall, the other end thereof being operatively connected to said switch means, a spring urging said rod to move toward said power wall, whereby upon movement of said power wall said rod is moved to actuate said switch means thereby energizing said solenoid.

* * * * *